United States Patent [19]
Yeow

[11] Patent Number: 5,557,674
[45] Date of Patent: Sep. 17, 1996

[54] ABSOLUTE STATIC LOCK OF FILES AND DIRECTORIES ON MAGNETIC DISK STORAGE MEDIA IN SINGLE MACHINE PERSONAL MICROCOMPUTERS

[75] Inventor: Kok-Wah Yeow, 712 Pasadena Avenue, Winnipeg, Manitoba R3T 2T3, Canada

[73] Assignee: Kok-Wah Yeow, Winnipeg, Canada

[21] Appl. No.: 342,169

[22] Filed: Nov. 18, 1994

[51] Int. Cl.$^6$ .................................................. G06F 12/14
[52] U.S. Cl. ........................... 380/4; 380/25; 364/DIG. 1; 364/246.6; 364/246.8; 364/246.9; 364/DIG. 2; 364/969; 364/969.4; 364/969.3
[58] Field of Search ......................... 380/4, 25; 364/200, 364/900

[56] References Cited

U.S. PATENT DOCUMENTS

| | | | |
|---|---|---|---|
| 4,757,533 | 7/1988 | Allen et al. | 380/25 |
| 5,007,082 | 4/1991 | Cummins | 380/4 |
| 5,027,396 | 6/1991 | Platteter et al. | 380/4 |
| 5,144,659 | 9/1992 | Jones | 380/4 |

*Primary Examiner*—Gilberto Barrón, Jr.

[57] ABSTRACT

A method by which absolute static lock may be applied at media level, to files and directories in File Allocation Table (FAT)-based storage media, of single machine personal microcomputers running within the Disk Operating System (DOS) or equivalent environment is disclosed. To apply absolute static lock at media level on a target file or directory, the directory entry data field on disk for the target file or directory in the host machine is located and read into a convenient area of the host machine memory. The directory entry data field is restructured according to the procedure and in the non-DOS format of this invention. The original directory entry data field on the target media is replaced with the restructured non-DOS directory entry data field of this invention. The corresponding target file cluster information contained in the FAT is protected. Encryption of the target file contents may be incorporated into the absolute lock process if required. Target files or directories upon which the absolute static lock of this invention has been successfully applied cannot be accessed by DOS at media level, for the critical operations of read, copy, overwrite and erase. The reverse unlock process, by which the previously applied absolute static lock may be removed from a target file or directory, restoring it to the original unlocked DOS state, is also disclosed. In the special case where the target media is a floppy, the method of applying, or removing, absolute static lock to the floppy disk, is also disclosed.

2 Claims, 4 Drawing Sheets

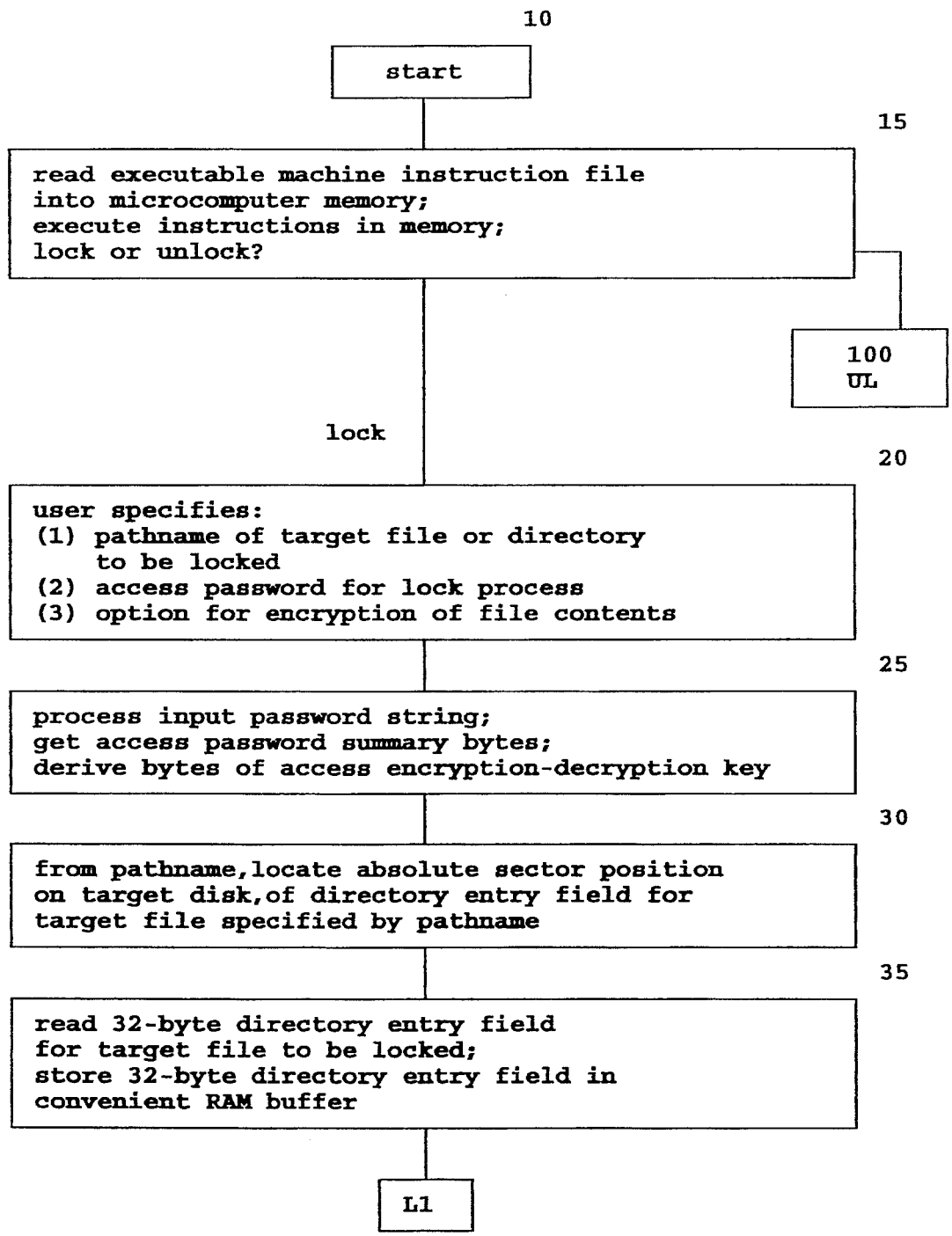

FIGURE 1: continued
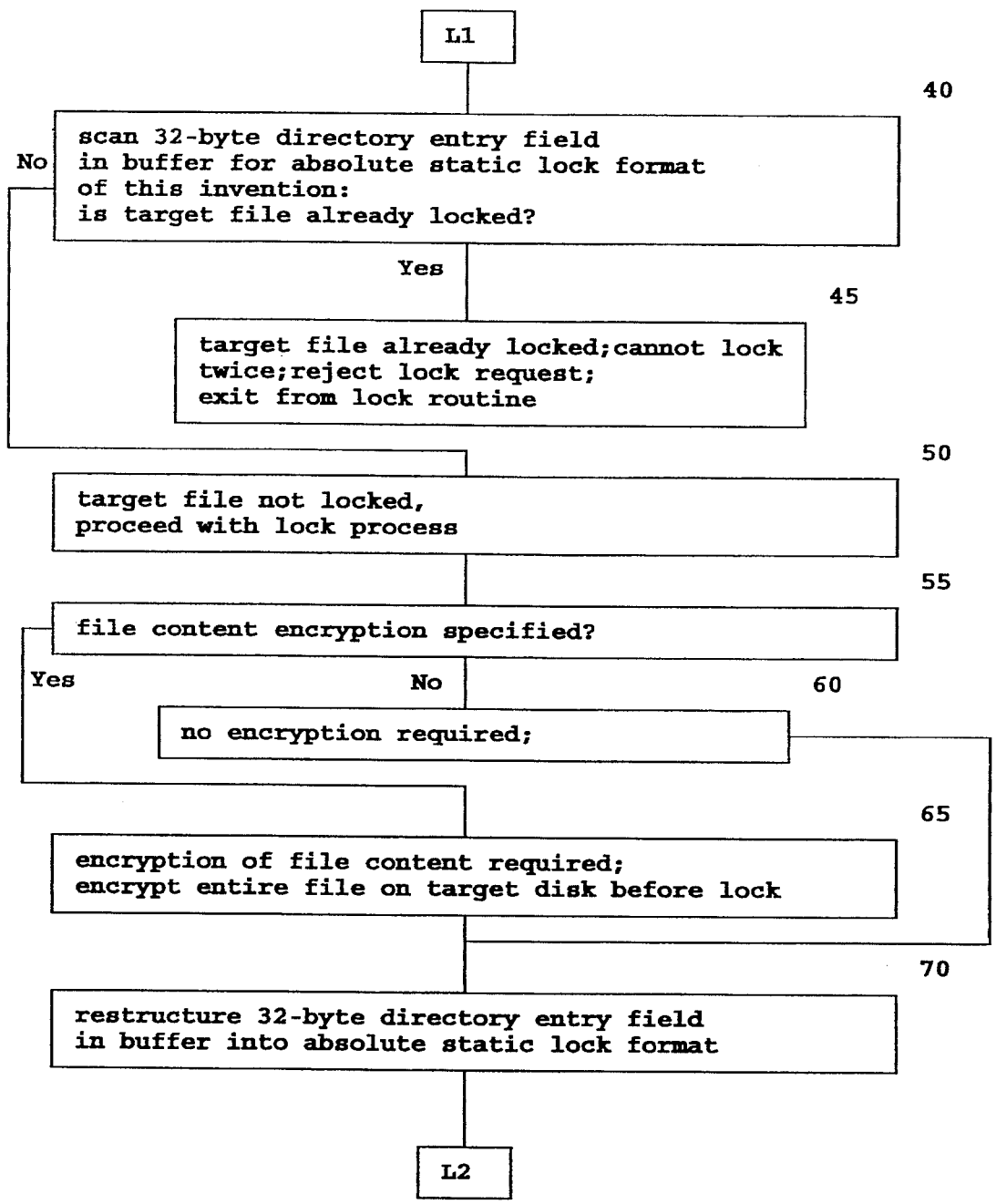

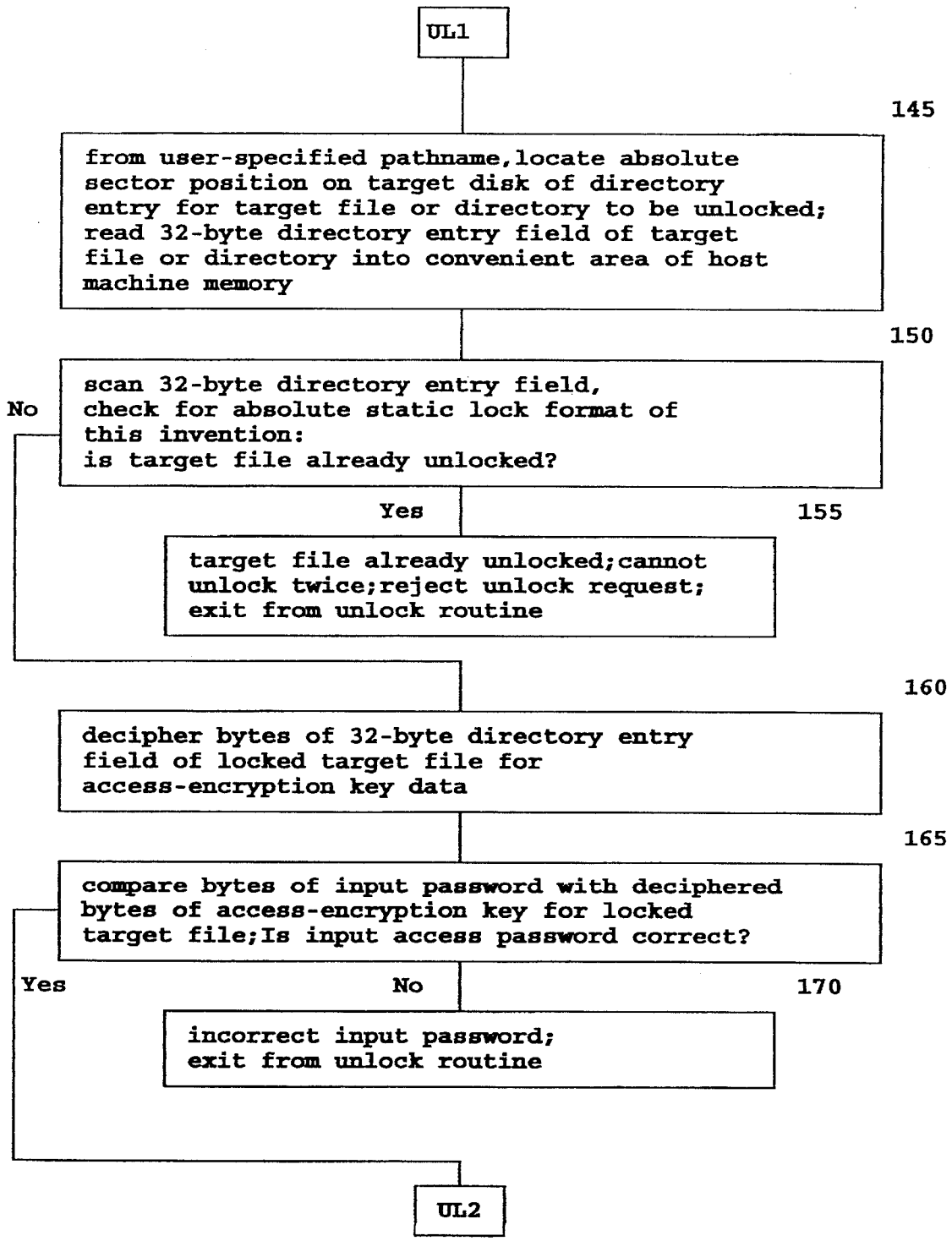
FIGURE 2: continued

FIGURE 2: continued
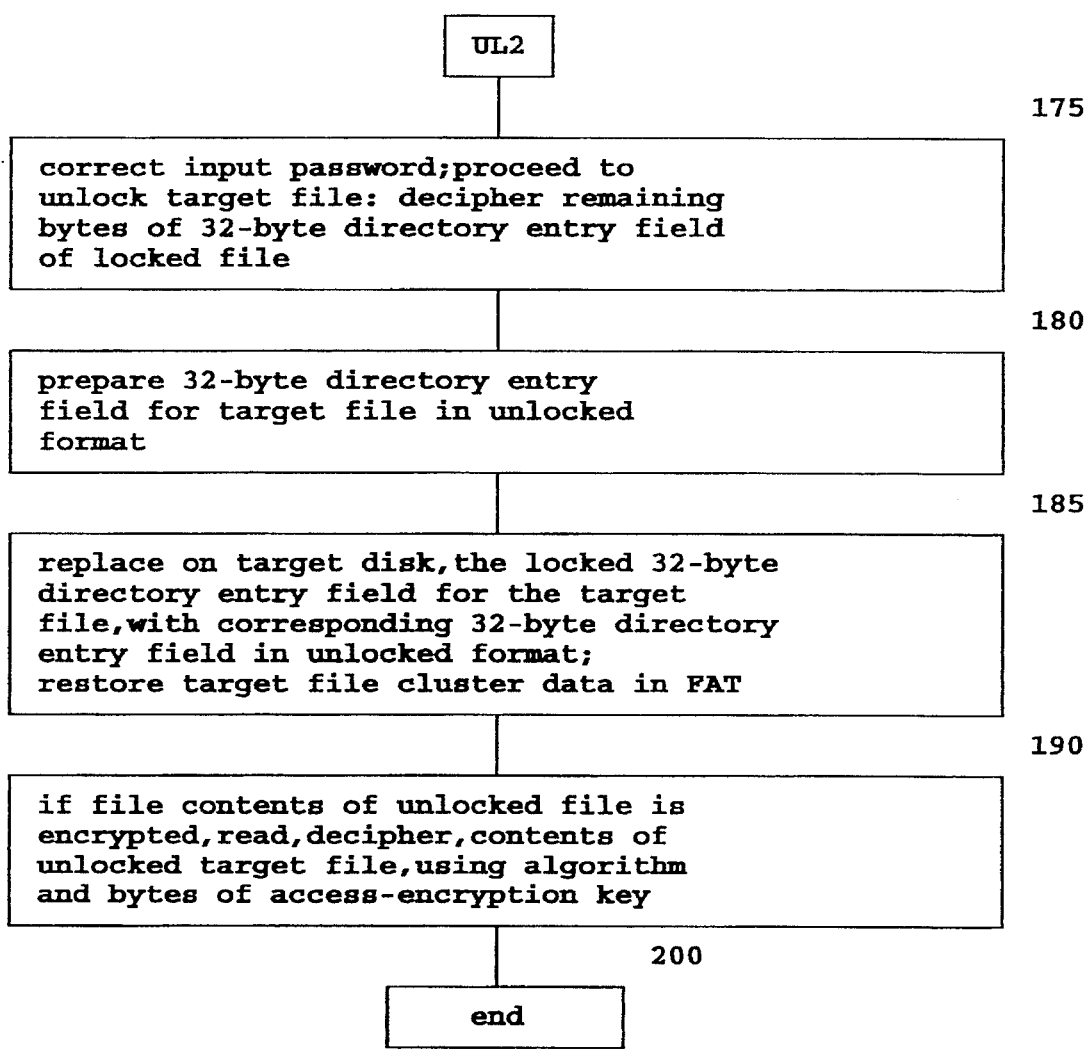

ABSOLUTE STATIC LOCK OF FILES AND DIRECTORIES ON MAGNETIC DISK STORAGE MEDIA IN SINGLE MACHINE PERSONAL MICROCOMPUTERS

TECHNICAL FIELD

This invention is in the general field of digital data storage security for personal microcomputers. Specifically, the invention is concerned with securing, in the absolute static sense, files and directories stored on fixed and removable magnetic disk media used in single machine personal microcomputers, or equivalent individual workstations in a network configuration, running within a Disk Operating System (DOS) environment which employ the DOS File Allocation Table (FAT) for magnetic disk storage, of which the Microsoft. Disk Operating System is an example, or FAT based operating systems fully compatible therewith, as described in the International Standards Organisation publication R9660.

BACKGROUND OF THE INVENTION

Current personal microcomputer technology based on DOS for magnetic disk storage media is fundamentally open, that is, digital data is organised, structured and stored on magnetic disk media in such a way that the operating system can access the data for input and output quickly and efficiently according to certain fixed rules, all of which are well known. Thus for example, DOS organises and accesses digital data on magnetic disk media, such as fixed-disks and removable floppy disks, in the form of files and directories according to a rigid structural scheme. For every file or directory created on the disk, DOS prepares a special 32-byte directory entry data field, containing crucial information on that particular file or directory. This data, together with cluster distribution information contained in the File Allocation Table (FAT) for the disk, enables DOS to determine the precise sector locations on the physical disk surface occupied by the file or directory.

A major consequence of the rigid DOS standard directory and FAT structure for files and directories on magnetic disk storage media, is simply that in single machines DOS cannot be prevented from accessing, at media level, any file or directory on disk for the crucially important function of read, and associated operations such as copy. In principle, therefore, DOS will be able to read and, if required, copy, any file or directory, as long as it is DOS-structured, and physically exists on the disk. From the viewpoint of data security for DOS formatted magnetic disk storage media, this invariably means that DOS-structured files and directories on disks cannot be secured or locked in the absolute static sense, that is, the operating system cannot be prevented from accessing any file or directory at the level of the disk media itself.

Although the prior art contains numerous references on methods and techniques for computer system and disk security, these deal mainly with copyprotection of magnetic disk storage media or with digital data encryption, as distinct from the absolute static lock at media level described in this invention. At the present time, current technology only allows files and directories on DOS disks to be secured by non-absolute, indirect methods. These include file encryption, file attribute modification, for example, hiding files from DOS directory searches, control of the operating system boot, or some means of file access control through menu-type RAM-, or ROM-, resident programs, and the like. In all of these methods, however, the target file or directory, and indeed, the disk itself, still remains essentially unsecured at media level: any access control barrier can always be bypassed, and the target file can always be read and copied directly by DOS at media level, albeit in encrypted or otherwise modified form. Moreover, file security is often achieved with some kind of penalty, for example, easy access to the fixed disk of the host machine may be severely hampered.

SUMMARY OF INVENTION

It is therefore the object of this invention to provide a new method for securing or locking files and directories on DOS magnetic disk storage media, in the absolute static sense, so as to prevent DOS from reading, copying or accessing the said locked files and directories at disk media level, but in a way completely transparent to the operating system, and in the case of fixed-disk media, allowing both the disk and the host machine, to retain full operational functions at all times.

It is an object of this invention to provide if required at the user's option, the means whereby encryption of file contents may be introduced and incorporated, into the said absolute static locking process.

It is another object of this invention, in the special case where the magnetic storage media is a standard floppy disk, to provide the means whereby the entire floppy disk itself may be locked at media level in the absolute static sense, so as to prevent the operating system of the host machine from accessing the floppy disk altogether.

It is also a further object of this invention to provide the reverse means by which files and directories, or floppy disks, locked by the process of this invention may be unlocked, and, where encryption had been incorporated during the absolute locking process, deciphered, and finally restored to their original unlocked state.

These objects of the invention, as will be apparent herein, are accomplished by making use of the new method disclosed in this invention.

In this invention, absolute static lock on the target file or directory residing in the target magnetic disk storage media, is achieved by restructuring in a certain specified way, the directory entry data field contained in the target magnetic disk storage media, for the said target file or directory, according to the non-DOS format disclosed in this invention. The directory entry data field with the absolute static lock format of this invention, contains bytes arranged in a specific non-DOS pattern, from which information, together with suitably protected target file cluster information contained in the FAT, the operating system of the host machine can be denied access for all the critical fundamental operations at disk media level on the locked file or directory, such as read, copy, overwrite, and erase.

Where at the option of the user, encryption is also required for contents of the target file during the absolute static lock process, such encryption information may be incorporated into the bytes of the modified directory entry data field. Information on any user-specified access password employed to protect the locked target file, is also incorporated into the said bytes.

In the special case where the target media is a standard floppy disk, this invention also provides the means whereby the floppy disk itself may be locked at media level. Absolute static lock is achieved in this case by restructuring the critical track located at side 0, track 0 of the disk, containing the boot sector of the said floppy disk, referred to herein as the boot track, into the non-DOS format of this invention, by which the operating system of the host machine will be totally denied access to the floppy disk.

The method of the reverse unlock process, by which the absolute static lock previously applied to the target file or directory, or to the entire floppy disk, may be removed, is also disclosed.

BRIEF DESCRIPTION OF THE DRAWINGS

FIG. 1 and FIG. 1 continued are flow charts of the sequence for applying absolute static lock to files and directories in magnetic disk storage media, and to standard floppy disks.

FIG. 2 and FIG. 2 continued flows chart of the reverse sequence for unlocking and restoring locked files and directories in magnetic disk storage media, and locked floppy disks.

DETAILED DESCRIPTION OF THE INVENTION

The preferred embodiment of the present invention relates to actual magnetic disk storage media, such as fixed-disks or floppy disks, and their RAM-disk or electronic-disk equivalent, in personal microcomputers running within a DOS environment. The system hardware for the preferred embodiment of this invention comprises the system hardware of the host microcomputer, including the necessary disk drives. The preferred embodiment of the present invention will be illustrated and described as follows.

In the preferred embodiment, absolute static lock of a target file or directory on the magnetic disk storage media, or the reverse unlock process thereof, is realized in the host microcomputer through an executable machine instruction file, recorded on convenient disk media. The executable machine instruction file allows the host machine to carry out the unique signature read, format, and write functions required in this invention, by which critical areas of the target media are modified into the non-DOS format of the invention. It is read into memory by the operating system of the host microcomputer containing the target file or directory to be locked, and executed.

FIG. 1 shows the detailed sequence of instructions for absolute static lock executed by the host machine, 10, 15, in the preferred embodiment of this invention.

At the start of the absolute lock process of this invention, 20, the user will be required to provide the DOS-valid pathname of the target file or directory to be locked. The pathname specifies the full filename of the target file or directory, including where applicable, any drive-directory path required by DOS to locate the target file.

Absolute static lock will require a key for access and encryption. Therefore, the user, at his option, will be required to specify a suitable access password for the lock process, and also to specify whether encryption of the target file contents is required.

The access password string provided by the user is processed by algorithm and summarized into a set of bytes, from which ultimately are derived the bytes of the access-encryption key, 25.

From the user-specified pathname for the target file, the DOS directory entry on disk for the target file is located, 30, and read into a convenient area of host machine memory, 35. The DOS directory entry data field for the target file is 32 bytes in length.

The said 32-byte DOS directory entry data field of the target file in the host machine memory is scanned to determine if it contains the absolute static lock format of this invention, 40. If such a format is detected, implying that the target file is already locked, then the original user request for absolute static lock on the target file will be rejected, and the machine will be instructed to exit the lock routine, 45. Otherwise, the target file will be presumed to be suitable for the application of the absolute static lock of this invention, 50.

If the encryption option has been selected, 55, the contents of the target file will first be encrypted with the said access-encryption key according to suitable encrypting algorithm, before absolute static lock is applied to the target file, 65. On the other hand, if encryption is not required, 60, then absolute static lock will be applied to the target file without encrypting the contents thereof.

To apply the absolute static lock of this invention to the target file, the 32-byte directory entry data field of the target file is restructured, 70, into the crucial non-DOS format of this invention given in Table 1. In Table 1, in accordance with usual digital labelling custom, the first byte is identified as byte 0, the second byte as byte 1, and so on, with the last byte in the 32-byte data field, identified as byte 31, and wherein also, all numbering will be given in the usual hexadecimal notation, denoted by the letter H.

TABLE 1

Absolute static lock format for 32-byte directory entry data field for target file or directory.

byte 00H to 0AH 11-character modified DOS filename of target file, including 3-character filename extension where applicable.

byte 0BH modified DOS file attribute byte 0CH to 15H group of 9 bytes, not necessarily in the order given below, comprising:
        original DOS file attribute byte
        first character of original DOS filename byte
        original DOS starting cluster bytes
        access-encryption key bytes byte 16H to 17H bytes for time created or last updated byte 18H to 19H bytes for date created or last updated byte 1CH to 1FH file size bytes Byte 0H in Table 1, corresponds to the first character of the filename for the target file in its locked state. In the preferred embodiment of this invention, to ensure easy identification of a locked file during normal DOS directory searches, the first character of its normal unlocked DOS filename will arbitrarily be replaced by some convenient distinguishing ASCII character, such as the ASCII character @. Thus, byte 0H in the 32-byte data field listed in Table 1, will be given the ASCII code value 64, to correspond to @. In DOS directory searches, locked files or directories will then appear with the first character of their normal DOS filenames replaced by @. For example, the file "CASH. DAT", when locked, will appear as "@ASH. DAT"

Byte 0BH in Table 1, containing the usual 8 bits, is the modified file attribute byte for the locked file. In the preferred embodiment of this invention, absolute static locked files will always be given an attribute byte with bit 0 set, that is, locked files will always be read-only. This will ensure that locked files cannot be overwritten or erased. The other bits of the modified attribute byte, other than bit 0, will also be suitably manipulated as required. For example, bit 1 will be set in the modified file attribute byte if the unlocked file was originally hidden.

Bytes 0CH to 15H in Table 1 of this invention, consist of the original DOS file attribute byte for the unlocked state, the byte for the original first character of the unlocked filename, the starting cluster bytes for the unlocked file, and the bytes of the access-encryption key. Overall security of the absolute lock mechanism of the preferred embodiment requires that these byte values be protected:in the preferred embodiment of this invention, the byte values are encrypted through suitable algorithm using the bytes of the access-encryption key.

When restructuring of the 32-byte directory entry data field into the locked format of this invention as given in Table 1 is finally complete, and the corresponding target file cluster information contained in the FAT is protected through suitable algorithm, the host machine will be instructed to replace the original 32-byte DOS directory entry data field on the target disk, with the locked data field of this invention, 75.

In the preferred embodiment of this invention, the target file cluster data contained in the FAT is protected directly by first copying the FAT cluster data for the target file, encrypted as required, onto a separate sector of the target disk, the precise location of which is incorporated into the starting cluster bytes for the locked file contained in the byte-field 0CH to 15H, as outlined in Table 1. Each cluster entry data in the FAT for the target file is then replaced with the standard bad-cluster hexadecimal signature, denoted here by (F)FF7H, or the equivalent thereof, so that the operating system will no longer overwrite these cluster positions in any subsequent disk operations.

In the special case where the magnetic disk storage media is a standard floppy disk, 80, absolute static lock may be extended if required at the user's option, 85, to a further stage, in addition to separately locking files and directories therein. In a floppy disk, the rigid structure with which DOS formats and organises the disk may be manipulated to ensure that the disk will be totally inaccessible to DOS.

In the preferred embodiment of this invention, the boot track of the target floppy is first read into a convenient area of memory of the host machine, 90. The boot track data for all sectors is encrypted according to algorithm using the bytes of the access-encryption key. Also, the total information in all the sectors in the track is suitably compressed to fit a reduced number of standard sectors. For example, in a 5.25 inch 360 Kilobyte floppy disk, with 9 sectors per track, the encrypted compressed boot track in the preferred embodiment of this invention, will be compressed to fit 8 standard sectors, and one small non-standard sector.

When encryption and compression of the original boot sector data in memory is complete, the host machine will then be instructed to reformat the boot track in the target floppy. In the preferred embodiment, the boot track of the target floppy is deliberately reformatted in such a way that the very first sector, the boot sector itself, has a non-standard size. In the preferred embodiment, the smallest sector size of 128 bytes per sector is arbitrarily used, although other non-standard sector sizes could also be used to similar effect. The remaining sectors of the reformatted boot track can have a standard size of 512 bytes per sector, though not necessarily so. After the boot track has been successfully reformatted according to the format prescribed in this invention, the encrypted and compressed boot track data in memory is then written into the individual sectors of the said reformatted boot track of this invention. The target floppy disk will now be locked in the absolute static sense at media level, and will be completely inaccessible to all DOS operations.

On successful conclusion of this step, the process of absolute static lock on the target file will then be complete, and the host machine will be instructed to exit the absolute static lock routine, 95.

FIG. 2 details the sequence of reverse unlock instructions in the preferred embodiment of this invention executed by the host machine, by which the absolute static lock on a target file or directory, may be removed, and the file restored to its original unlocked DOS state, 100.

To unlock a locked target file, the user specifies the full pathname of the target file, and the access password for the unlock request, 110. The input password string is processed to obtain the password bytes, 115.

If the target media is not a floppy disk, then in the preferred embodiment, the host machine will be instructed to execute step 145 in FIG. 2.

On the other hand, if the target disk is a floppy disk, 120, the preferred embodiment of this invention will first read the boot track into machine memory, 125. Special routines in the preferred embodiment enable boot tracks with both the standard DOS format, and the non-standard format of this invention, to be read. Boot track data in memory is then scanned to determine if the target floppy is already locked. Presence of the non-standard track format of this invention will provide such an test. The input password is then checked with the access-encryption key data contained in the encrypted boot track data in memory, 130.

Incorrect input password will cause the host machine to exit, 135. Correct input password will allow the subsequent unlock instructions to be executed, 140. The boot track data in memory is deciphered and decompressed back to normal DOS format through algorithm and bytes of the access-encryption key. The boot track of the target floppy is then formatted with standard DOS format, and the deciphered, decompressed data in memory written into its sectors.

Step 145 in FIG. 2 in the preferred embodiment will then be executed by the host machine. From the full pathname of the target file, its 32-byte directory entry data field in the target disk is located, and read into a convenient area of machine memory.

This 32-byte directory entry data field of the target file in memory is scanned for the absolute static lock format of this invention, 150. If the absolute static lock format is not found, implying that the target file is already unlocked, the unlock request will be rejected, and the host machine will exit the unlock routine, 155.

On the other hand, if the target file is found to be locked, the said 32-byte directory entry data field now in machine memory, having the format given in Table 1, will first be partly deciphered by algorithm, to provide the bytes of the access-encryption key originally used in the absolute static lock process, 160. The input password bytes provided by the user for the unlock process will then be compared with the said key bytes, 165. Incorrect input password will cause the host machine to exit the unlock routine, 170. Correct access password for the unlock request allows the host machine to decipher by algorithm, the remaining bytes of the 32-byte locked directory entry data field in memory, and to continue with the unlock sequence, 175.

The 32-byte directory entry data field for the target file in the original unlocked DOS format is then constructed from the deciphered bytes, 180, according to Table 2. When complete, the host machine will use the said directory entry data field with unlocked DOS format, to replace the locked 32-byte directory entry data field of this invention, 185, on the target disk. The corresponding protected target file cluster information contained in the FAT is also restored to its original unlocked state, from data contained in the special disk sector, whose precise location is given by the starting cluster bytes for the locked file, specified in the locked format byte-field 0CH to 15H already described in Table 1.

If during the initial scanning, the locked target file is found to be encrypted as well, then the encrypted contents of the target file will also be deciphered, but only after the said target file has been successfully unlocked, 190.

On successful completion of the unlock process on the target file or directory, the host machine will finally exit the unlock routine, 200.

TABLE 2

Standard unlocked DOS format for 32-byte directory entry data field for target file or directory.

byte 0H to 0AH
    11-character DOS filename for unlocked file, including 3-character filename extension where applicable byte 0BH
    file attribute byte 16H to 17H
    time created or last updated byte 18H to 19H
    date created or last updated byte 1AH to 1BH
    starting cluster bytes byte 1CH to 1FH
    filesize bytes A new method for securing and locking in the absolute static sense, files and directories in magnetic disk storage media of personal microcomputers running on DOS or operating systems fully compatible therewith, and for locking standard floppy disks used in these machines, has been described. The absolute static lock of this invention may be applied with advantage to any kind of file or directory residing on FAT based fixed-disk or removable-disk media, protecting the file or directory from the crucial DOS operations of read, copy, overwrite and erase.

The method of the reverse unlock process has also been described, by which the previously applied absolute static lock on a target file or directory, or floppy disk, may be removed, and the target file or directory, or floppy disk, restored to its original unlocked DOS state.

The significant advantages of this invention are as follows.

Target files or directories upon which absolute static lock has been successfully applied in accordance with the procedure of this invention cannot be read, copied, overwritten, or erased by DOS, but will still appear as normal files in the DOS directory.

By the method disclosed in this invention, absolute static lock is achieved on the target file or directory at media level simply and effectively, in a manner completely transparent to DOS.

The absolute static lock on the target file or directory at media level is achieved without the necessity of any controlling file.

In this invention, the cluster entry data contained in the FAT for the locked target file is protected in the absolute static sense, and the actual physical clusters on the disk occupied by the target file cannot be overwritten or erased. Suppose, for example, that the read-only attribute for a locked target file is deliberately changed to normal, and DOS is then used to erase the target file from the DOS directory. In this invention, DOS erase will not in any way affect cluster data for the target file contained in the FAT, or the actual physical disk clusters thereof. These will remain intact, and will not be overwritten in subsequent DOS operations on the disk, even though the corresponding directory entry for the target file itself may be overwritten and destroyed. If this occurs, the file clusters will simply become a group of linked, orphan clusters. Through special software, data in these orphan clusters can be recovered, and the erased file reconstructed if necessary.

In the special case where the target media is a floppy disk, application of the absolute static lock at media level of this invention to the said target floppy renders the floppy completely inaccessible to DOS, since the target disk is, in effect, no longer a DOS disk.

While the preferred embodiment of this invention has been described and illustrated in the foregoing with particular reference to magnetic disk storage media, it will be appreciated that numerous modifications and changes thereon are likely to occur to those skilled in the art, and that applications of the method can also be found in other forms of storage media. It is the intent of the claims given as follows to include those modifications and changes which fall within the true spirit and scope of this invention.

FIGURE 1: continued
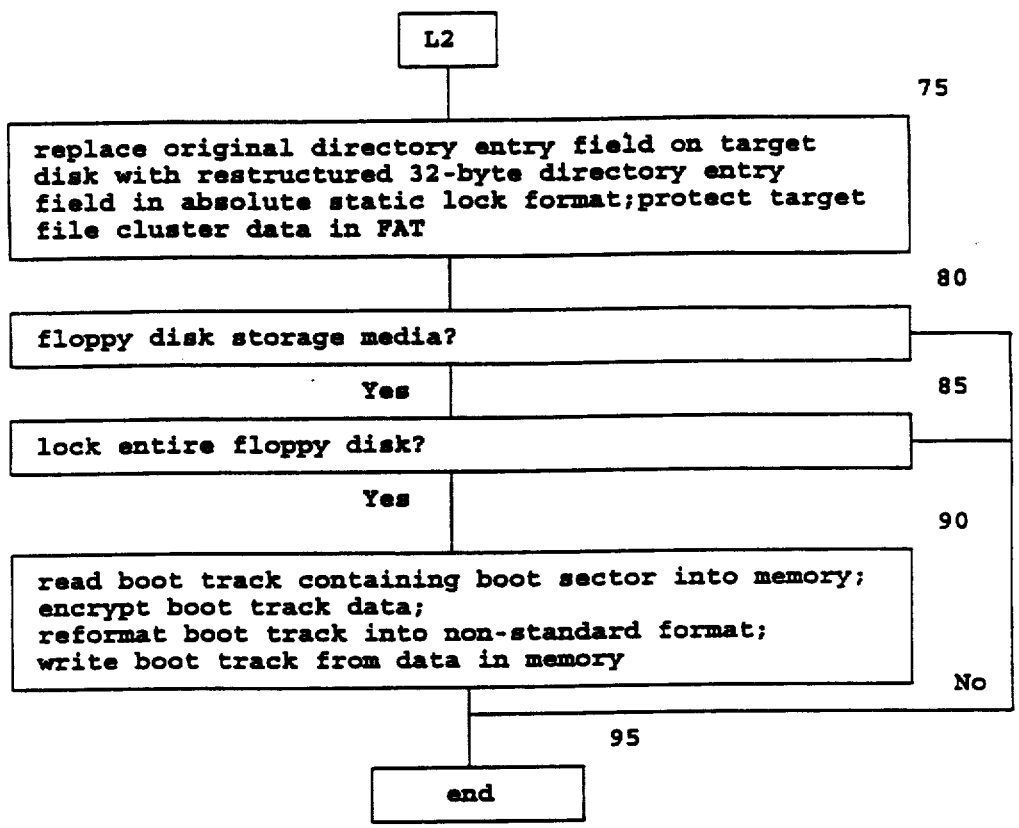

I claim:

1. In a file storage system of a digital computer, implemented in fixed or removable disk storage media by operating system means and BIOS means of said computer, the method of absolute static lock for securing files and removable floppy disks in said storage system, from access by the operating system of the computer, or by that of any other compatible computer, for operations including read, copy, overwrite and erase, comprising the steps of:

(a) modifying directory entry field for the target file into a special null format, including alteration of the directory entry data for filesize, and file starting cluster, to null values, whereby said target file in a locked state will appear to the operating system specifically as a null diskfile possessing null filesize and null starting cluster bytes;

(b) said modification including storage of data in encrypted form at predetermined byte offset positions within the directory entry field, said data storage being completely transparent to the operating system, and said offset or equivalent positions not normally used by, or are functionally transparent to, the operating system of the computer;

(c) said stored data including data on summary bytes for the access password accompanying the user request to lock the target file, and including also data in encrypted form, specifying physical locations in target disk surface wherein is stored the main bulk of decoding data required to unlock the locked target file completely;

(d) protecting the file allocation table entries comprising the file allocation table cluster-chain for the target file, effected by marking said entries as being reserved and physically unusable, thereby rendering the physical disk storage areas occupied by the target file inaccessible to the operating system of said computer;

(e) reserving and protecting, in the disk media containing said target file, suitable storage area with adequate byte capacity in which to store decoding information required to unlock a locked target file completely, said reserved storage area being associated, and uniquely identified, with its own file allocation table cluster-chain data, corresponding to the actual physical cluster locations on the surface of the disk said reserved storage area occupies; p1 (f) in the case where the target disk media is a floppy disk, suitably adjusting the track layout parameters permitting program means of said method in conjunction with BIOS means of said computer to reformat the entire outermost track of the floppy disk into a predetermined, non-standard, encrypted, compressed format, said outermost track containing the boot sector for the disk occupying first sector position in said track;

(g) said track format also including at least a non-standard sector size for the boot sector.

2. In the method of claim 1, further including using a computer-readable medium by which absolute lock is applied to, or removed from, a target file or floppy disk, of said storage system, including executable machine instructions for said computer.

* * * * *

UNITED STATES PATENT AND TRADEMARK OFFICE
CERTIFICATE OF CORRECTION

PATENT NO. : 5,557,674

DATED : September 17, 1996

INVENTOR(S) : Yeow

It is certified that error appears in the above-identified patent and that said Letters Patent is hereby corrected as shown below:

On the title page, column 2, last line change

"2 Claims, 4 Drawing Sheets" should be replaced by "2 Claims, 6 Drawing Sheets"

missing drawing sheets:
Sheet 3 of 6, and Sheet 4 of 6, are herewith enclosed.

drawing sheet identification:
sheet numbering should be corrected as follows:

"Sheet 1 of 4", to be replaced by "Sheet 1 of 6"
"Sheet 2 of 4", to be replaced by "Sheet 2 of 6"
"Sheet 3 of 4", to be replaced by "Sheet 5 of 6"
"Sheet 4 of 4", to be replaced by "Sheet 6 of 6"

column 9, line 7:
"p1" should be deleted.

Signed and Sealed this

Twenty-second Day of April, 1997

Attest:

BRUCE LEHMAN

Attesting Officer

Commissioner of Patents and Trademarks

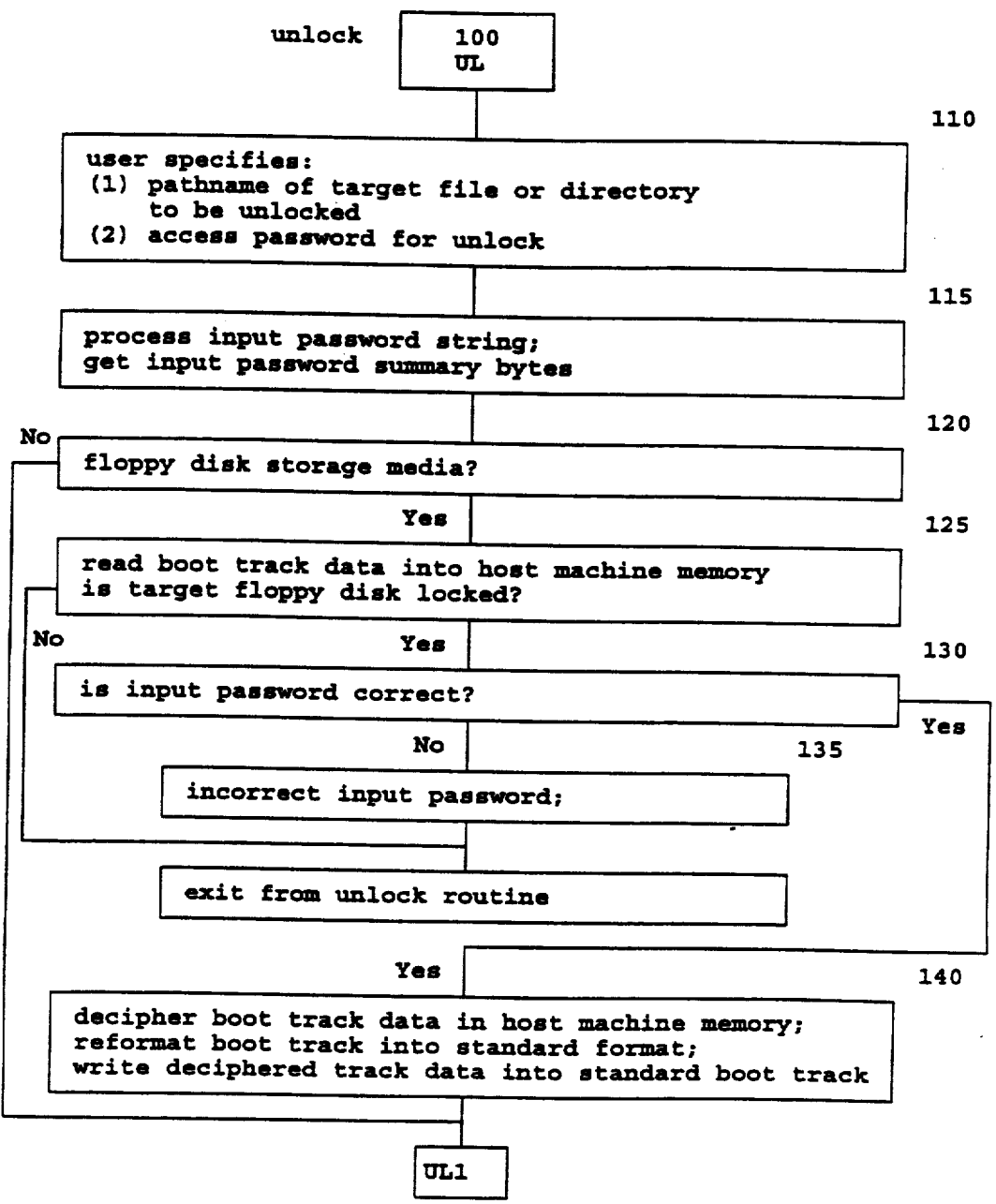
FIGURE 2: FLOWCHART FOR REVERSE UNLOCK PROCESS TO REVERSE ABSOLUTE STATIC LOCK